UNITED STATES PATENT OFFICE.

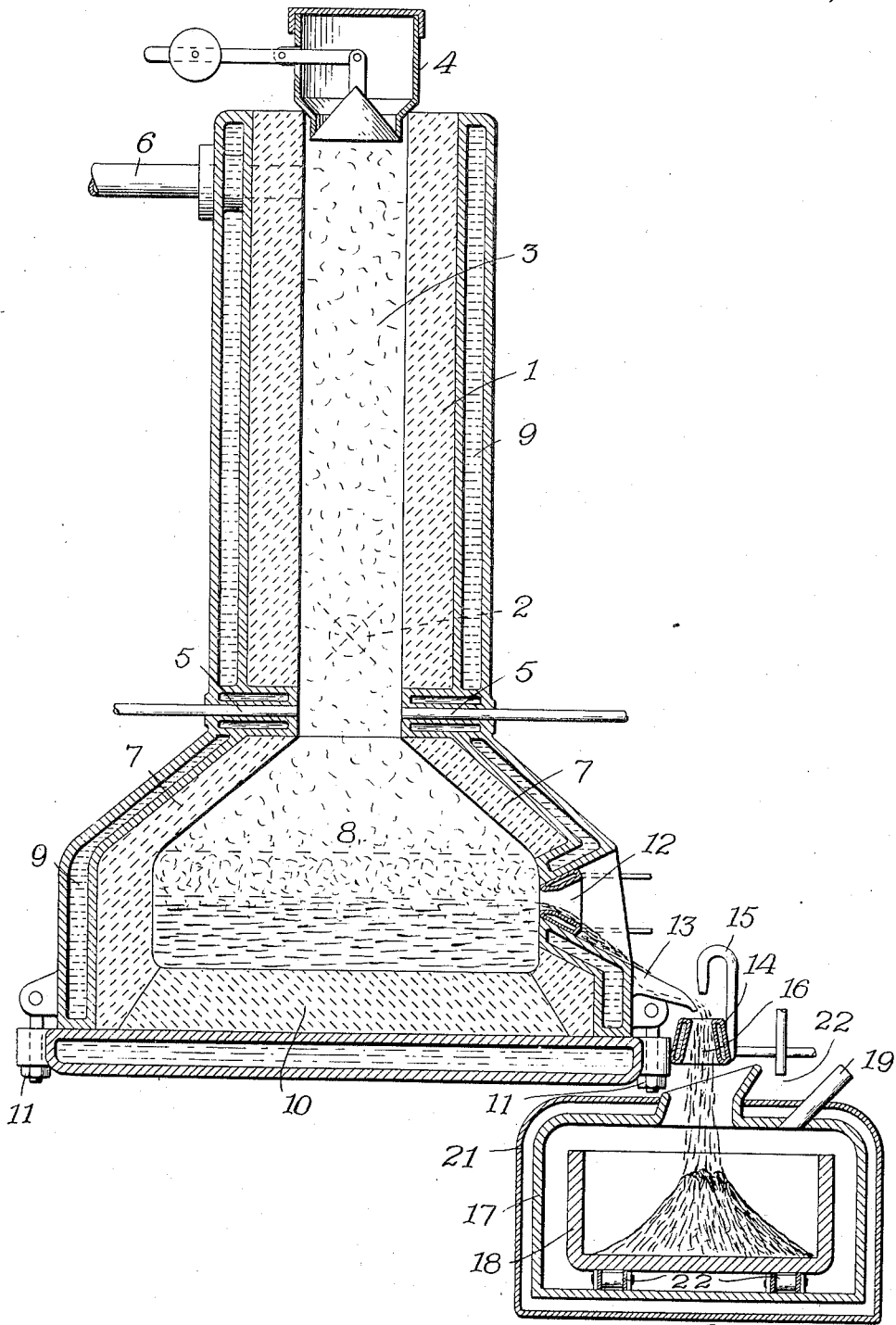

FRED E. NORTON, OF WORCESTER, MASSACHUSETTS.

PROCESS AND APPARATUS FOR THE MANUFACTURE OF CARBIDS AND DERIVATIVES THEREOF.

1,374,317.     Specification of Letters Patent.     Patented Apr. 12, 1921.

Application filed April 1, 1918. Serial No. 226,076.

*To all whom it may concern:*

Be it known that I, FRED E. NORTON, a citizen of the United States, residing at Worcester, in the county of Worcester and Commonwealth of Massachusetts, have invented a new and useful Improvement in Processes and Apparatus for the Manufacture of Carbids and Derivatives Thereof, of which the following, together with the accompanying drawing, is a specification.

The present invention relates to the manufacture of carbids, such as calcium carbid, silicon carbid, and the like; and also relates to the production of certain derivatives of said carbids, as for instance the substance known as cyanamid, which is obtainable from calcium carbid.

The invention resides in the adaptation of broadly new principles and steps for the production of carbids of various metals, such as calcium, aluminum and the like, and also in the provision of novel instrumentalities for bringing about the reactions which characterize such production. The invention also resides in the combination and adaptation of the novel steps incident to the carbid production with certain other broadly new principles designed to secure rapidly and cheaply the continuous conversion of the carbid product into a desired derivative thereof; more specifically, with respect to calcium carbid, the invention deals with the manufacture of cyanamid therefrom by a novel mode of treatment involving the use of apparatus differing widely from apparatus for the same purpose heretofore known, as described in detail hereinafter.

The principles of the invention, as well as other and further advantages accruing from its use, are fully set forth in the following description, reference being had to the accompanying drawing, the single figure of which illustrates diagrammatically and by way of example merely, one form of apparatus by means of which the various steps of the process, both for the production of carbid, and (if this product be calcium carbid) for the production of cyanamid, may be carried out. It is to be understood, however, that the practice of my invention is not confined or limited in any way to the use of the herein described or any other particular arrangement of the apparatus, it being clear that the novel features and principles thereof are wholly independent of the specific means employed for carrying the same into practice.

Heretofore the manufacture of carbids, such as calcium carbid, has been carried out by intense heat produced in an electric furnace, and acting on, in the case of calcium carbid, a suitable mixture of lime and coke, to produce the reaction

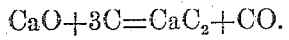
$$CaO + 3C = CaC_2 + CO.$$

The disadvantages of this process, as commonly practised, are numerous; the materials constituting the charge must be melted and the heat giving source must be at a higher temperature than the mass which is being fused; the temperature required in practice, 2000 to 3000° centigrade, is above the reaction temperature of the calcium and the carbon, and the heat must be available in large quantities, thus making the cost of the electric current very high, notwithstanding the fact that water power is ordinarily used for its production. Furthermore, for the conversion of the resulting calcium carbid into cyanamid, it is necessary to first completely cool and then to pulverize the product of the electric furnace, prior to the treatment of the same with nitrogen; these various steps involve considerable expense, labor and time, and the nitrogen treatment, as at present practised, involves the reheating of the pulverized carbid, either electrically or by the combustion of fuel, to a considerable degree before the nitrogen reaction sets in.

The present invention contemplates the production of carbids of the various metals or bases by the combustion of a portion of the carbon which constitutes the charge; since the formation of carbid in itself requires large amounts of carbon, as well as heat, it is clearly an economic advantage to produce the heat required by the combustion of an excess of carbon introduced with the charge, rather than by the conversion of power into heat, (a necessarily wasteful process) and the consumption of energy which could be more economically used for other processes requiring actual electrolytic or mechanical work. The present invention further contemplates the manufacture of the carbid derivative, such as cyanamid in the case of calcium carbid, directly and continuously from the carbid as the latter is produced, thus doing away with the necessity for cooling and pulverizing, as well as with the necessity for reheating the product of the carbid furnace to bring about the nitrogen reaction.

As a means of illustrating the manner in which the various steps of my invention may be carried out, I have illustrated in the accompanying drawing a retort or furnace 1, which may, if desired, be suitably supported for tilting, as by means of trunnions 2. The walls of the furnace are preferably constructed of firebrick, or other heat resisting material, to form an elongated shaft or charge receiving chamber 3, having at the top thereof a suitable charging hopper 4. The charge for the production of the carbid, consisting of the oxid, hydroxid, carbonate, or silicate, of the desired base, (calcium, aluminum, or the like) together with an amount of carbon, in the form of coal, coke, or other carbonaceous fuel, in excess of that required for union with the base, is fed in at the top of shaft 3; as it descends therein, it is gradually heated by the combustion occurring near the lower end of said shaft, where a plurality of blasts of substantially pure oxygen are continuously introduced, through suitable water cooled oxygen twyers 5, 5.

The oxygen supports and maintains an intense degree of combustion in the zone of its introduction, as will readily be understood. In this zone, by proper regulation of the oxygen supply, and provided there is an excess of carbon in the charge, the fusion of the charge will be complete, while above the combustion zone the reactions produced by the heat will be extremely complex. However, the carbid reaction, (in the case of calcium oxid, the union of the calcium and carbon,) which is produced as hereinafter more fully described, in the furnace, of necessity liberates carbon monoxid (CO) and this same gas is the product of the excess carbon under the influence of the oxygen blast entering through twyers 5, 5. Therefore, assuming that the materials of the charge are pure, and that the blast is pure oxygen, the only gas evolved is pure carbon monoxid, and this may escape from the top of shaft 3 through a pipe 6, and may be used as a fuel gas, for driving gas engines, or for any other desired purpose. On the other hand, if the material be not pure, the composition of the escaping gas will vary; with an excess of carbon present in that part of the furnace which is reached by the blast, the escaping gas would be carbon monoxid mixed with any water, steam, or nitrogen that may have entered with the blast in case pure oxygen is not used; or if the charge contained any foreign matter, the hot CO gas would accomplish its reduction and removal, as will be well understood. In any event, the reactions and reductions occurring in the shaft 3 above the zone of intense combustion are not of vital importance as effecting the production of carbid. It is sufficient merely that the charge reaching the combustion zone shall contain an excess of carbon above that required to reduce the oxids of the charge, as for instance in the case of calcium oxid, according to the reaction $$CaO + 3C = CaC_2 + CO.$$

The combustion of this excess carbon, supported by the oxygen blast from twyers 5 furnishes the heat for the above reaction, and it is evident that the amount of excess carbon required to be supplied and burned depends on the amount of heat required to fuse the materials of the charge and to balance the heat losses of the furnace. The formation of carbid, as above described, in the zone of combustion will be exceedingly rapid, and in the case of calcium, this will cause the above reaction to continue in the regions of the furnace just below the twyers 5, 5. In these regions, preferably defined by flaring walls 7, there will be a highly heated mass of coke or carbonaceous matter in contact with partly fused metallic oxid, in addition to the molten carbid slag which collects at the bottom of the reduction chamber 8 defined by flaring walls 7. In the absence of oxygen from this chamber 8, there is no actual combustion, but the region below the twyers 5 will continue to receive an intense degree of heat by radiation from the combustion zone immediately above. As a consequence, the incandescent coke or carbonaceous matter in excess in this chamber will, in the absence of oxygen, take oxygen from the fused oxid, and in the case of lime or calcium oxid will release the calcium. Under the intensely high temperatures prevailing in this chamber, it may be that some calcium vapor is formed which combines with the remainder of the carbon to form carbid, or it may be that the carbid reaction takes place simultaneously with the release of the oxygen from the calcium, without any sensible production of metallic calcium. The exact character of the reaction in this region is impossible of determination; however, this particular reaction depends upon the absence of oxygen, and therefore it must take place below the zone where oxygen is introduced.

The chamber 8 is preferably made flaring, as above described, so that the molten slag bath which collects therein will present as large a surface as possible to the intense radiation from the combustion zone immediately above, and also so as to hasten the descent of materials from the shaft 3, and secure within said chamber a larger surface of contact and thus a longer time for the carbid reaction to take place. The furnace is also preferably constructed so that all the heat produced is rapidly absorbed by the charge, being concentrated for the most part at the zone of fusion or combustion. To this end the oxygen twyers 5, 5 are preferably opposed so as to baffle the blast and prevent its direct contact with the walls of the furnace. In addition, the walls of the furnace may be water cooled, as by the provision of water jackets 9, 9 through which a constant circulation of cooling water is maintained. As shown, the furnace may be provided with a removable bottom 10, to permit of easy access to the interior for repairing the lining thereof, said bottom being held in place by any suitable means such as bolts 11.

The molten carbid which collects in the form of slag in the bottom of chamber 8 is discharged through taphole 12 in the side of said chamber in a continuous stream through spout 13, and may be collected in any desired manner, cooled and solidified; in the case of calcium carbid, it will be clear that substance thus collected is ready for commercial distribution and can be used in the well known manner for the production of acetylene gas. Or, if it be desired to convert the molten calcium carbid into cyanamid, by treatment with nitrogen, this treatment can be carried on continuously as fast as the molten substance flows out of the furnace, without resort to the heretofore intermediate steps of cooling, pulverizing and reheating the product of the carbid reaction.

To this end, the spout 13 may discharge the molten substance into a disintegrator 14, wherein is provided a continuous blast of nitrogen from a jet or nozzle 15. The cold gas blown against the molten stream of slag drives it forcibly through water cooled funnel 16 of the disintegrator and brings about its sudden solidification, at the same time completely disintegrating or reducing it to the form of a light wool or a powder, depending on the nature of the slag. The disintegrated and partly cooled substance passes from the funnel 16 continuously into a closed container 17, being received upon a slowly moving vessel or conveyer 18 within said container. The blast of nitrogen from jet or nozzle 15 may be so regulated as to cool the carbid to the point where reaction between the nitrogen and the carbid may begin, about 800° centigrade. This reaction is continued in the interior of container 17 as the substance received on the conveyer 18 is gradually moved through the length of said container, an atmosphere of nitrogen being maintained in said container for this purpose, and the amount of nitrogen being controlled by escape passages 19 placed at various intervals along the length of the container. As this reaction, $$CaC_2 + 2N = CaCN_2 + C,$$

takes place with the evolution of heat, it will be necessary to limit the temperature within container 17 to prevent the reversal of the reaction; this can be done in a great variety of ways, as by water cooling the exterior walls of the container, by a spray or by water jackets 21. The traveling vessel or conveyer 18 may be moved through the container 18 in a variety of ways, as for instance by traveling chains 22, or the like.

It will thus be seen that my invention provides for the continuous manufacture of carbids in a new and highly efficient manner, by the combustion of a portion of the carbon in the charge over and above that required for the carbid reaction. The combustion is supported and maintained with sufficient intensity to bring about reaction by the introduction of oxygen, in the absence of other inert gases. Oxygen for this purpose may be available from air separation or reduction apparatus of any well known type, which will also supply, in the case of calcium carbid, the necessary nitrogen for the conversion of the carbid directly and continuously into cyanamid, as above described. This conversion is promoted to a great degree by the division and disintegration of the carbid product into a fine powder, under the action of the nitrogen blast, whereby the surface exposed to the action of nitrogen reaches the maximum and allows the reaction to take place in the most advantageous manner.

I claim,

1. The herein described process for the continuous manufacture of carbids, from a mixture of carbon and the desired oxid or hydroxid, by the combustion of a portion of the carbon in said mixture in the presence of oxygen alone.

2. The herein described process for the manufacture of carbids, from a mixture containing carbon and the desired ore, by the combustion in the presence of oxygen alone of an excess of carbon in said mixture.

3. The herein described process for the manufacture of carbids, from a mixture of carbon and the desired ore, by the combustion in the presence of oxygen alone of carbon in said mixture in excess of that required for the carbid reaction.

4. The herein described process for the continuous manufacture of carbids, from a mixture of carbon and the desired oxid or hydroxid, by the combustion with oxygen alone of a portion of the carbon in said mixture in the absence of inert or diluting gases.

5. In a process for the manufacture of carbids, the deoxidization of an ore by the combustion with oxygen alone, of carbon in excess of that required for the carbid reaction.

6. In a carbid process, the generation of heat for the fusion of the charge by the combustion in the presence of oxygen alone of an excess of carbon in said charge.

7. In a process of the class described, the formation of carbid from a charge containing ore and carbon, by the combustion with oxygen alone of the carbon in said charge in excess of that required for the carbid reaction.

8. In a carbid process, the formation of carbon dioxid by reduction of the ore of the charge, and the formation of carbon monoxid by the combustion of the carbon of the charge in the presence of oxygen alone.

9. In a carbid process, the formation of carbon monoxid by reduction of the ore of the charge, and the formation of carbon monoxid by the combustion of the carbon of the charge in the presence of oxygen alone.

10. In a carbid process, the formation of carbon dioxid by reduction of the ore of the charge, and the formation of carbon monoxid by the combustion with oxygen alone, in the absence of inert or diluting gases, of a portion of the carbon of the charge.

11. In a carbid process, the formation of carbon dioxid by reduction of the ore of the charge, and the further formation of carbon dioxid by the combustion with oxygen alone, in the absence of inert or diluting gases, of a portion of the carbon of the charge in excess of the carbon required for the carbid reaction.

12. A process for the production of calcium carbid, comprising the fusion of a charge of lime and carbonaceous matter by the combustion in the presence of oxygen alone of an excess of said carbonaceous matter over and above that which unites with the calcium of the lime.

13. A process for the production of calcium carbid, from a charge of calcium oxid and carbon, comprising the fusion of the calcium oxid, and the reduction thereof to calcium, for union with carbon, in the presence of incandescent carbon and in the absence of oxygen.

14. A process for the production of calcium carbid, from a charge of calcium oxid and carbon, comprising the fusion of the calcium oxid by combustion of an excess of carbon in the presence of oxygen, and the reduction of the fused calcium oxid, in the presence of incandescent carbon and in the absence of oxygen.

15. A process for the production of carbid, from a charge of ore and carbon, comprising the formation of molten carbid and the fusion of the ore, by heat evolved from the combustion of an excess of carbon, with oxygen, and the reduction of the fused ore in the presence of incandescent carbon, and in the absence of oxygen.

16. A calcium carbid process, comprising the combustion of carbon with oxygen alone for the fusion of the charge, the reduction of the fused calcium oxid in the presence of incandescent carbon, and the union of the calcium thus produced with carbon.

17. A calcium carbid process, comprising the combustion of carbon with oxygen for the fusion of the charge, the reduction of the fused calcium oxid in the presence of incandescent carbon, and the union of the calcium thus produced with carbon in the absence of oxygen.

18. A calcium carbid process, comprising the combustion of carbon with oxygen alone for the fusion of the charge, the reduction of the fused calcium oxid in the presence of incandescent carbon, and the union of the calcium thus produced with carbon under the influence of the heat produced by the aforesaid combustion.

19. In apparatus of the class described, a chamber for receiving a charge of ore and carbon, means for introducing oxygen in said chamber to support the combustion of excess carbon in said charge, and a chamber for reducing said ore in the absence of oxygen.

20. In apparatus of the class described, a charge receiving chamber providing a combustion zone, means for introducing oxygen alone to said combustion zone, and a reduction chamber for the reception of material passing through said combustion zone, and heated by radiation therefrom.

21. In apparatus of the class described, a charge receiving chamber providing a combustion zone, means for introducing oxygen to said combustion zone, and a reduction chamber of greater area than said combustion zone, and heated by radiation therefrom.

22. In apparatus of the class described, means providing a passage of increasing cross section, means for procuring the gravity flow of molten carbid through said passage, and means for simultaneously directing a blast of cold gas through said passage, to disintegrate and solidify said carbid.

23. A process for the production of a carbid derivative, comprising the introduction of a blast of nitrogen to a stream of molten calcium carbid.

24. A process for the production of a carbid derivative, comprising the progressive disintegration of a stream of molten calcium carbid, and the subjection of said carbid, as disintegrated, to an atmosphere of nitrogen.

25. A process for the production of a carbid derivative, comprising the subjection of a stream of molten calcium carbid to a blast of nitrogen, and the prolonged subjection of the resulting disintegrated product to an atmosphere of nitrogen.

26. A process for the production of cyanamid, comprising the continuous production of molten calcium carbid, the progressive disintegration thereof, and the progressive subjection of the disintegrated product, while still retaining a portion of its heat, to an atmosphere of nitrogen.

27. A process for the production of cyanamid, comprising the continuous production of molten calcium carbid, the subjection thereof in a flowing stream, to a blast of cold gas, and the subjection of the resulting disintegrated product to an atmosphere of nitrogen.

28. A process for the production of cyanamid, comprising the continuous production of molten calcium carbid, the subjection thereof in a flowing stream, to a blast of cold gas, the movement of the resulting disintegrated product through an atmosphere of nitrogen, and the extraction of heat produced by the nitrogen reaction.

29. A process for the continuous production of cyanamid, comprising the fusion of charges of calcium oxid and carbon, by the combustion with oxygen of excess carbon therein, the reduction of the fused oxid, in the absence of oxygen, to form with carbon, molten calcium carbid, the subjection of said carbid, in a flowing stream, to a disintegration jet, and the subjection of the product to an atmosphere of nitrogen.

30. A process for the continuous production of cyanamid, comprising the fusion of charges of calcium oxid and carbon, by the combustion with oxygen of excess carbon therein, the reduction of the fused oxid, in the absence of oxygen, to form with carbon, molten calcium carbid, the continuous disintegration of said carbid, as produced, and the cooling thereof to the temperature required for the nitrogen reaction.

31. In apparatus of the class described, means for producing molten calcium carbid, means for continuously disintegrating the same, and means for subjecting the disintegrated product to an atmosphere of nitrogen.

32. In apparatus of the class described, a furnace for the production of molten calcium carbid, in combination with means for cooling and disintegrating the molten product discharged from said furnace, a receiving means for the disintegrated product, and means for moving said receiving means through an atmosphere of nitrogen.

33. In apparatus of the class described, a furnace for the production of molten calcium carbid, in combination with means for cooling and disintegrating the molten product discharged from said furnace, a receiving means for the disintegrated product, means for moving said receiving means through an atmosphere of nitrogen, and means for maintaining the temperature required for the nitrogen reaction.

Dated this 26th day of March, 1918.

FRED E. NORTON.

Witnesses:
Rufus B. Fowler,
Nellie Whalen.